Dec. 6, 1960 E. A. GERBER 2,963,597

MEANS FOR COMPENSATING THE STATIC CAPACITANCE OF PIEZO-ELECTRIC CRYSTALS

Filed Jan. 2, 1957

*INVENTOR.*
EDUARD A. GERBER

*BY*

Harry M. Saragovitz
ATTORNEY

United States Patent Office 2,963,597

Patented Dec. 6, 1960

2,963,597

MEANS FOR COMPENSATING THE STATIC CAPACITANCE OF PIEZO-ELECTRIC CRYSTALS

Eduard A. Gerber, West Long Branch, N.J., assignor to the United States of America as represented by the Secretary of the Army Filed Jan. 2, 1957, Ser. No. 632,250

2 Claims. (Cl. 310—8.2)

(Granted under Title 35, U.S. Code (1952), sec. 266)

The invention described herein may be manufactured and used by or for the Government for governmental purposes, without the payment of any royalty thereon.

This invention relates to piezo-electric crystals and particularly to special inductance arrangements to compensate for the static capacitance of a crystal.

In low frequency operation, it is known practice and quite adequate to compensate for the detrimental influence of the reactance of the static capacitance of the crystal and its holder by connecting an external inductance across the terminals of the crystal unit to neutralize this capacitance. At higher frequencies, however, this becomes impractical because the influence of the inductance of the mounting wires and the resistance of the interconnecting elements and bonding material within the crystal holder becomes appreciable and provide reactances which are comparable in magnitude or larger than the holder capacitance and the electrode capacitance which is to be neutralized.

It is an object of this invention to provide a piezo-crystal unit which will not be open to this objection.

Another object of this invention is to provide a crystal unit which will achieve reliable frequency control in the frequency range of 100 to 400 megacycle/second region.

A further object of the invention is to provide an inductance for compensation of the static capacitance of a crystal unit which requires very little space and has a high degree of stability.

The above objectives are accomplished by depositing a film of metal within the crystal unit which includes a crystal and a holder therefor. Said film acts as an inductance of such value that its positive reactance essentially cancels the negative reactance of the static capacitance of the crystal. In one embodiment of the invention the inductance may be deposited on the crystal wafer, and in another modification the inductance may be deposited on the holder.

For a more detailed description of the invention, together with other and further objects thereof, reference is had to the following description taken in connection with the accompanying drawing, wherein.

Figure 1:
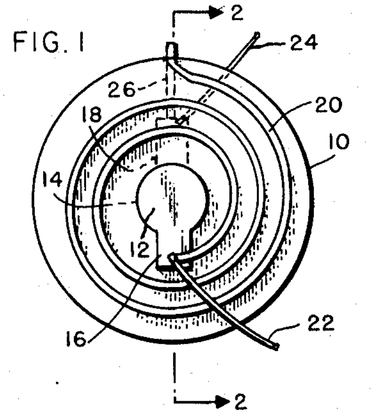
Fig. 1 is a front elevational view of a crystal unit in accordance with an embodiment of the invention.

In the drawing the several views have been greatly exaggerated to more clearly define the various elements.

Figure 2:
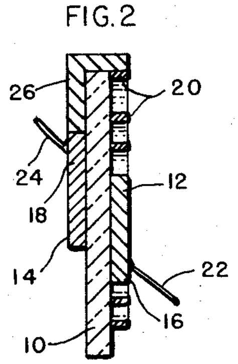
Fig. 2 is a cross-section along line 2—2 of Fig. 1 looking in the direction of the arrows.

Referring now more particularly to Figs. 1 and 2 of the drawing, a crystal wafer 10 is shown which is of a piezo-electric material such as quartz or the like. Electrodes 12 and 14 are plated onto the central portion of each face of wafer 10. Electrodes 12 and 14 comprise tabs 16 and 18, respectively, which extend radially in opposite directions a relatively short distance, thereby insuring an uncovered portion of the crystal face between the terminus of each tab and the rim of wafer 10.

On one face of the wafer 10, an inductance 20, formed as a spiral, is deposited by plating or painting a film of metal thereon. One end of the spiral inductance 20 is connected to tab 16 of the electrode 12 and then convolutely wound on the face of wafer 10 to its rim, as shown more clearly in Fig. 1. The upper end of inductance 20 is then connected by means of a plated lead 26 to tab 18 of electrode 14 on the opposite face of wafer 10. Extending from the opposite faces of the crystal and secured respectively to tabs 16 and 18 are discrete conductive leads 22 and 24. If necessary or desirable additional turns can be plated or painted on the opposite face of the crystal wafer 10.

Figure 3:
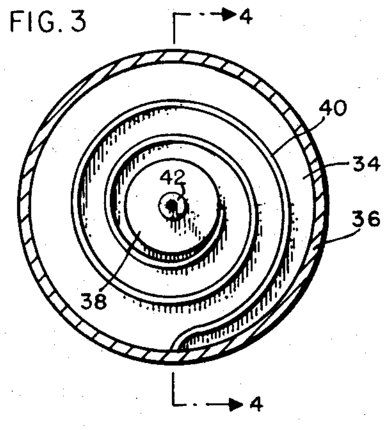
Fig. 3 is a frontal elevational view of another embodiment of the present invention.
Figure 4:
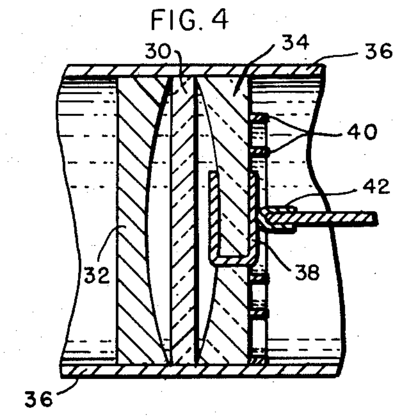
Fig. 4 is a cross-section along line 4—4 looking in the direction of the arrows.

In Figs. 3 and 4 an unplated pressure type piezo-electric crystal wafer 30 is mounted between a metal electrode 32 and a ceramic disc 34. The outermost peripheral edges of the members 32 and 34 and also that of the piezo-electric crystal wafer 30 are of similar circular form and disposed in loose fitting relation with respect to the inner wall of the cylindrical metal case 36. The assembly is held in compression by means of a suitable compression force not shown. Metal electrode 32 has a concave face coextensive with an opposing face of wafer 30, and ceramic disc 34 similarly has a concave face coextensive with and opposing the opposite face of wafer 30.

A thin metallic layer 38 is provided on the center portions of the faces of disc 34 to serve as a second electrode, the layers being continuous through any suitable opening, or may be connected in other manners such as a wire clamp or the like. One end of a spiral inductance 40 painted or plated on the outside face of disc 34 is connected to layer 38 and convolutely wound to the rim of disc 34 where its other end makes contact with metal case 36. A metal rod 42 makes contact with layer 38.

Figure 5:
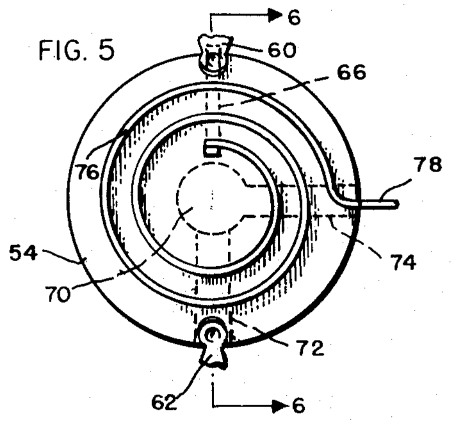
Fig. 5 is a front elevational view of a further embodiment of the present invention.
Figure 6:
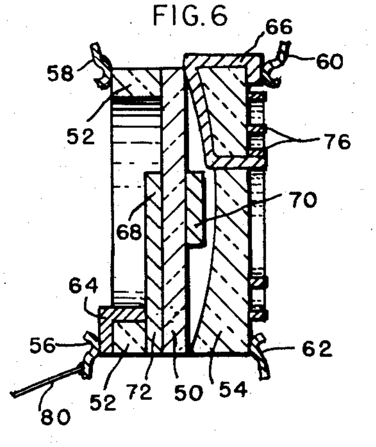
Fig. 6 is a cross-section along line 6—6 looking in the direction of the arrows.

Figs. 5 and 6 show a pressure type crystal unit comprising a piezo-electric crystal element 50, which may be in the form of a thin circularly shaped quartz crystal wafer supported by and between mounting members 52 and 54. The entire assembly is resiliently held in compression by means of suitable springs 56, 58, 60 and 62. The mounting members 52 and 54 are made of ceramic or other suitable insulating material and are co-extensive with wafer 50. Member 52 is a ring and has applied thereon a metal conductor 64 extending along its side walls and inner surface and terminates in contact with spring 56. Member 54 is a disc having a concave face in contact with an opposing face of wafer 50. A metal conductor 66 extends along a portion of the inner surface of member 54, continues over its rim and extends a relatively short distance on its outer face and terminates in contact with spring 60.

Electrodes 68 and 70 are plated on the opposite sides of the central portion of wafer 50. Tab 72 which is an extension of electrode 68 extends radially to the rim of wafer 50 and contacts metallic conductor 64 on the side wall of member 52. Tab 74 which is an extension of electrode 70 extends radially to the rim of wafer 50 in a direction perpendicular relative to the direction of tab 72 on the opposite face of wafer 50.

On the outer face of member 54, an inductance 76, formed as a spiral, is deposited by plating or painting a film of metal thereon. The inner end of the convolutely wound inductance 76 extends through a suitable opening in member 54 and is connected to conductor 66 as shown. The other end of inductance 76 terminates at tab 74. This can be accomplished by extending inductance 76 over the rim of disc 54. Secured to tab 74 is a conductive lead 78. A second lead 80 is connected to spring 56.

In each of the modifications described, it will be noted that there has been provided an inductance in shunt with the piezo-electric crystal wafer, said inductance being of a value required to neutralize the static capacitance of the crystal.

While there has been described what are at present considered to be the preferred embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A crystal unit comprising a piezo-electric crystal, a pair of electrodes centrally positioned on opposite faces of said crystal and being smaller in area than said crystal, said faces having non-covered areas surrounding said electrodes and extending to the rim portions of said crystal, means for neutralizing the static capacitance of said crystal, said means comprising a spiral inductance formed on and abutting a non-covered area of a face of said crystal and connected at one end to one of said electrodes and convolutely wound to the rim of said crystal, the other end of said inductance extending over said rim and connected to the electrode on the opposite face of said crystal to form an electrical parallel arrangement thereacross.

2. A unit as set forth in claim 1, wherein said inductance is plated on the face of said crystal.

References Cited in the file of this patent

UNITED STATES PATENTS

| | | |
|---|---|---|
| 1,957,063 | Hansell | May 1, 1934 |
| 2,329,321 | Bock | Sept. 14, 1943 |
| 2,488,290 | Hansell | Nov. 15, 1949 |
| 2,508,720 | Kuenstler | May 23, 1950 |
| 2,514,337 | Reid | July 4, 1950 |
| 2,598,722 | Richards | June 3, 1952 |
| 2,677,064 | Hill | Apr. 27, 1954 |

FOREIGN PATENTS

| | | |
|---|---|---|
| 993,891 | France | Aug. 3, 1951 |